(12) United States Patent
Fukushima et al.

(10) Patent No.: US 6,584,272 B1
(45) Date of Patent: Jun. 24, 2003

(54) DATA RECORDING APPARATUS

(75) Inventors: Shinichiro Fukushima, Yokohama (JP); Tsukasa Hasegawa, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/352,342

(22) Filed: Jul. 13, 1999

(30) Foreign Application Priority Data

Jul. 15, 1998 (JP) .......................................... 10-200043

(51) Int. Cl.$^7$ ................................................. H04N 5/76
(52) U.S. Cl. ......................................... 386/46; 386/111
(58) Field of Search ............................... 386/1, 45, 46, 386/33, 111–113, 125–126; 348/207.99, 231.1, 231.2, 231.3, 231.4; 360/39, 55; 369/32.01, 33.01, 47.1, 52.1, 53.1, 99; 345/723; H04N 5/76, 5/92, 9/79, 5/781

(56) References Cited

U.S. PATENT DOCUMENTS

| 6,285,632 B1 | * | 9/2001 | Ueki ........................... 369/32 |
| 6,330,004 B1 | * | 12/2001 | Matsuzawa et al. ......... 345/723 |
| 6,407,772 B2 | * | 6/2002 | Mizoguchi ................... 348/220 |

FOREIGN PATENT DOCUMENTS

| JP | 5-20754 | 1/1993 |
| JP | 6-309895 | 11/1994 |
| JP | 8-65616 | 3/1996 |
| JP | 9-179597 | 7/1997 |

* cited by examiner

Primary Examiner—Thai Tran
(74) Attorney, Agent, or Firm—Mattingly, Stanger & Malur, P.C.

(57) ABSTRACT

In a data recording apparatus capable of recording data while varying the amount of data per unit of time (at a variable rate), the present invention makes it possible to indicate an allowable recording time period on a disc and operational information according to user-specified setup conditions and the remaining capacity of the disc when a user determines conditions for record programming. An allowable recording time period on the disc is calculated on the basis of the remaining capacity of the disc and at least one of the following parameters; a maximum variable-rate value, a minimum variable-rate value, and an average variable-rate value to enable recording video data in most cases. Then, the result of calculation is displayed on a screen. Further, according to user-specified setup conditions including a programmed recording time period and the calculated allowable recording period on the disc, it is determined whether a normal variable-rate recording operation is applicable or an adjusted variable-rate recording operation is required. The result of the determination is displayed on a screen which is so arranged that the user can select either the normal variable-rate recording operation or the adjusted variable-rate recording operation.

9 Claims, 8 Drawing Sheets

DATA RECORDING APPARATUS

BACKGROUND OF THE INVENTION

1. Field of the Invention

The present invention relates to a data recording technique, and more particularly to a data recording technique which is capable of indicating such information as an allowable recording time period on a recording medium to a user in case that encoding recording of video and audio data is performed while the amount of data to be recorded per unit of time is varied, i.e., data is recorded at a variable recording rate.

2. Description of the Related Art

Recent advances in digital technology have led to increasing proliferation of digital VTRs in lieu of conventional VTRs. By recording data with a variable-rate encoding method (data encoding method) called MPEG2 (Moving Picture Experts Group Phase 2), it would be possible to achieve long-hour recording on a disc-type recording medium such as a DVD-RAM.

A data recording apparatus such as a VTR for home use is generally employed to record TV programs. In Japanese Unexamined Patent Application No. 20754/1993, for example, there is disclosed a timer operation management apparatus using a technique for adjusting a recording time period so that a preselected TV program can be recorded on a tape. In a conventional VTR or other recording equipment, if the remaining capacity of tape necessary for recording a preselected TV program is found to be insufficient in timer presetting, the timer operation management apparatus proposed in this disclosure automatically recognizes insufficiency of the remaining capacity of tape and selects a proper recording speed to prevent possible non-recording of a part of the preselected TV program.

A technique for detecting the remaining capacity of tape according to such a condition as a change in reel rotating speed is also known.

Further, Japanese Unexamined Patent Application No. 65616/1996, for example, shows a digital recording apparatus and digital recording method for recording/reproducing video and audio data on a recording medium without insufficiency and excessive surplus with respect to the remaining capacity thereof in digital video-audio data recording/playing equipment.

In most of these conventional data recording arrangements, two recording time modes, i.e., standard-time recording mode and long-time recording mode are available. In a TV program recording operation in the standard-time recording mode, if it is judged that the remaining time on tape is to be insufficient for recording a selected TV program, a lower tape running speed or a lower transfer bit rate is taken at and from a certain point in time to set up the long-time recording mode so that the selected TV program can be contained onto the tape currently loaded.

Still further, Japanese Unexamined Patent Application No. 179597/1997 shows an audio data recording apparatus for recording audio data into memory on the principle of variable-length coding, in which an allowable recording time period is indicated through calculation on the remaining capacity of memory and a predicted average coded bit rate.

SUMMARY OF THE INVENTION

In a data recording arrangement in which a variable recording rate technique such as MPEG2 is used to encode data for TV program recording on a DVD-RAM or another similar disc serving as a recording medium, for example, the allowable recording capacity of the disc can be indicated in terms of the amount of data easily but it is rather difficult to accurately calculate the amount of time allowable for recording thereon. Since data is recorded at a variable rate, the amount of data recorded per unit of time varies therewith.

It is however required to let a user know an allowable recording time period properly when needed by the user. In data recording at a variable rate, it may also be required to ensure a recording time period desired by the user in addition to mere indication of the remaining time on the disc. Further, there is a need to indicate programmed recording information such as a time period to be taken for recording operation and proper operational information according to the remaining capacity of the disc. Under some operational conditions selected by the user, proper adjustment of an average value representing the amount of data to be recorded per unit of time is also required.

It is therefore an object of the present invention to solve the above-mentioned problems by providing a data recording apparatus and technique wherein an allowable recording time period can be indicated in data recording at a variable rate, alternatives in recording condition setting can be indicated according to the allowable recording time period, and the amount of data to be recorded per unit of time can be adjusted under certain user-selected operational conditions.

In accomplishing this object of the present invention and according to one aspect thereof, there is provided a data recording arrangement comprising:

recording-reading means for recording data on a recording medium while varying the amount of data per unit of time and for reading out the data thus recorded on the recording medium;

calculating means for determining an allowable recording capacity of the recording medium and calculating an allowable recording time period thereon according to the determined allowable recording capacity and the amount of data per unit of time; and indicating means for indicating the calculated allowable recording time period.

Further, in accordance with another aspect of the present invention there is provided a data recording arrangement comprising:

recording-reading means for recording data on a recording medium while varying the amount of data per unit of time according to recording conditions and for reading out the data thus recorded on the recording medium;

calculating means for determining an allowable recording capacity of the recording medium and calculating an allowable recording time period thereon according to the determined allowable recording capacity and the amount of data per unit of time;

control means for controlling data recording operation according to setup conditions specified through input means;

decision means for determining recording conditions according to the calculated allowable recording time period and the setup conditions specified through the input means; and indicating means for indicating the calculated allowable recording time period and the determined recording conditions.

Still further, in accordance with another aspect of the present invention, a data recording arrangement, in which data is recorded on a recording medium while the amount of data per unit of time is varied, is provided to include indicating means for presenting an allowable recording time period to be taken for recording data for the longest period of time, an allowable recording time period to be taken for recording data for the shortest period of time, and an allowable recording time period to be taken for recording data on the basis of an average value of the amount of data per unit of time.

The above and other objects, features and advantages of the present invention will become more apparent from the following detailed description with reference to the accompanying drawings.

DETAILED DESCRIPTION OF THE PREFERRED EMBODIMENTS

Figure 1:
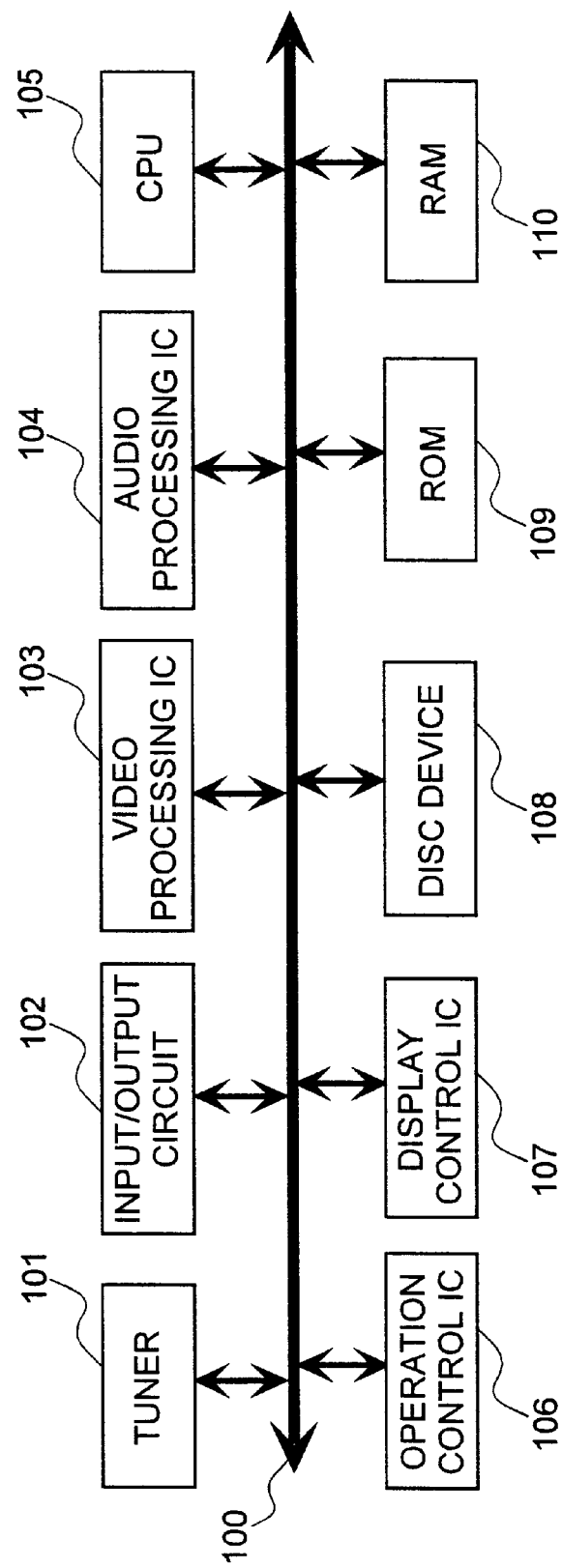
FIG. 1 is a block diagram showing an example of an internal configuration of a disc recorder in a preferred embodiment of the present invention.

The present invention will now be described in detail by way of example with reference to the accompanying drawings, in which like reference numerals are used to designate like or corresponding parts throughout: Reference numeral 100 indicates a bus, 101 indicates a tuner, 102 indicates an input/output circuit, 103 indicates a video processing IC, 104 indicates an audio processing IC, 105 indicates a CPU, 106 indicates an operation control IC, 107 indicates a display control IC, 108 indicates a disc device, 109 indicates a ROM, 110 indicates a RAM, and 201, 300, 400, 500, 600, 700, 800, 900 and 1000 indicate screens.

Referring to FIG. 1, there is shown an internal configuration diagram of a data recording apparatus which is capable of recording data on a disc-type recording medium at a variable rate (hereinafter referred to as a disc recorder) in a preferred embodiment of the present invention. Reference numeral 100 designates an internal bus used for transferring signals among component circuits of the disc recorder. Reference numeral 101 designates a tuner for receiving broadcast waves including ordinary terrestrial TV broadcast waves, satellite broadcast waves (BS and CS waves), and cable-TV broadcast waves. Reference numeral 102 designates an input/output circuit for outputting video and audio signals from the disc recorder to a TV monitor in playback operation and for inputting video and audio signals from a set-top box such as a dedicated satellite broadcast tuner to the disc recorder in recording operation. Reference numeral 103 designates a video processing IC for encoding input (broadcast) video data in recording on a disc and for decoding coded video data in playback. Reference numeral 104 designates an audio processing IC for encoding input audio data in recording on the disc and for decoding coded audio data in playback. While the video processing IC 103 and the audio processing IC 104 are provided as dedicated ICs in the present preferred embodiment, a part or the whole of these dedicated ICs may also be implemented in a form of software in a modified arrangement. Reference numeral 105 designates a CPU for running operation programs to control the entire operation of the disc recorder. Reference numeral 106 designates an operation control IC for controlling operations instructed through an operation panel or remote controller. Reference numeral 107 designates a display control IC for controlling display of user-interface information on a liquid-crystal display panel, TV monitor or any other display device. Reference numeral 108 designates a disc device for performing disc operation control to record data on the disc and read data therefrom. Reference numeral 109 designates a ROM for storing operation programs and the like. Reference numeral 110 designates a RAM which is necessary for operations of the CPU.

In the present preferred embodiment, under control of the CPU 105, the disc device 108 performs a normal variable-rate recording operation in which data is recorded on the disc while varying the amount of data per unit of time or an adjusted variable-rate recording operation in which an average value of variable rates is adjusted so that data can be recorded for a user-specified period of time according to the remaining capacity of the disc. Using the ROM 109 containing the operation programs and the RAM 110, the CPU 105 calculates an allowable recording time period according to the remaining capacity of the disc attained through the disc device 108 and the amount of data to be recorded per unit of time. Further, the CPU 105 carries out the following operations: (1) An average amount of data per unit of time in variable-rate recording operation is calculated. (2) An optimum average value of variable rates is calculated to enable recording for a desired period of time according to the remaining capacity of the disc. (3) In adjusted variable-rate recording operation, the disc device 108 is controlled so that a variable rate is adjusted to meet the average value thus calculated. Still further, in record programming, the CPU 105 establishes a recording time period desired by a user, a time period to be reserved after recording, and a level of image quality. Furthermore, the CPU 105 forms a judgment whether or not data can be recorded in a selected mode of operation. The display control IC 108 is used to indicate the allowable recording time period calculated as mentioned above and the judgment result regarding whether or not data can be recorded in the selected mode of operation.

Figure 2:
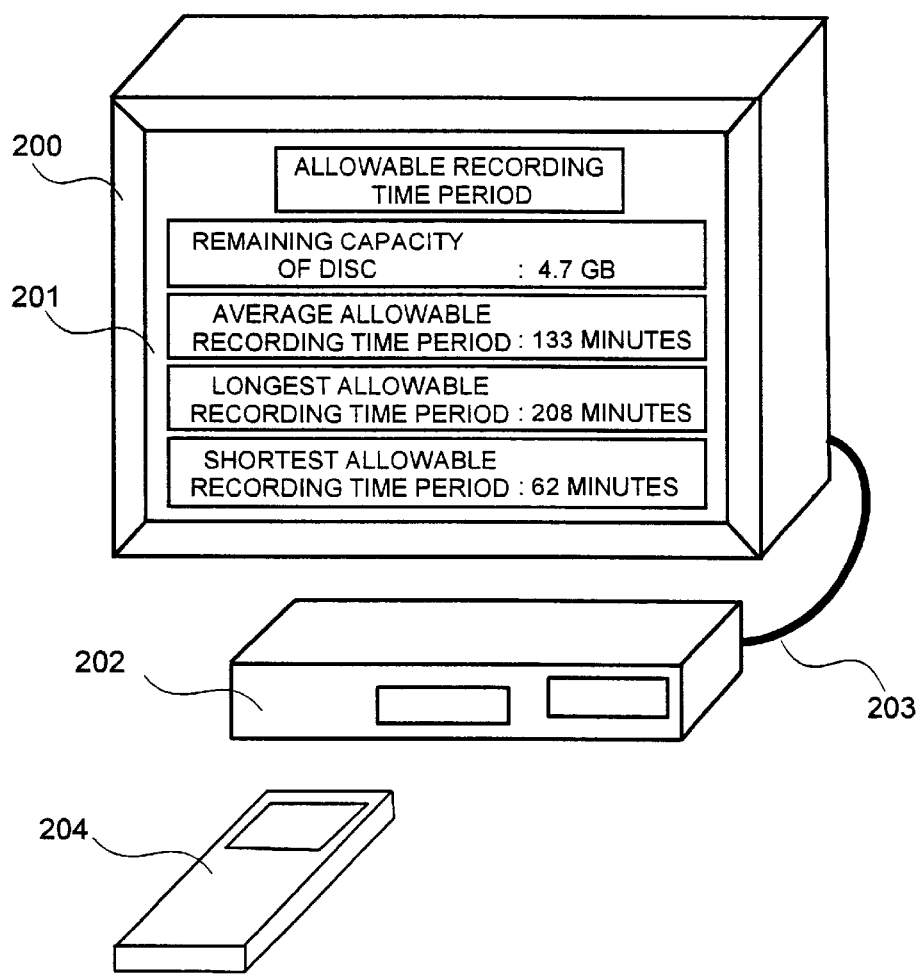
FIG. 2 is a diagrammatic illustration showing a representative usage form of the disc recorder for indicating an allowable recording time period on a disc.

Referring to FIG. 2, there is shown a representative usage form of the disc recorder for indicating an allowable recording time period on a disc. In this example, a disc recorder 202 having an internal configuration shown in FIG. 1 is connected to a TV monitor 200 (display device) through a connecting cable 203. The disc recorder 202 presents an allowable disc recording time period on screen 201 displayed on the TV monitor 200. The disc recorder 202 is arranged so that the user can operate the disc recorder 202 with a remote controller 204 in addition to control means thereof.

The following describes a data recording technique for indicating an allowable recording time period on the disc and providing user-interface information which shows alternatives in recording condition setting according to the allowable recording time period.

In a conventional VTR, for instance, if the remaining amount of tape (i.e., the remaining length of tape) is known, it is easy to calculate an allowable recording time period on the basis of a tape running speed for recording. In the disc recorder, if data is recorded at a fixed recording rate (the amount of data per unit of time is constant) or at a recording rate determined by the disc recorder, an allowable recording period time can be calculated easily on the basis of the recording rate and the amount of data recordable on the disc.

Generally, in variable-rate data recording, a recording rate is increased to increase the amount of data per unit of time if it is difficult to make a encoding rate higher due to such a reason as a large degree of picture movement, whereas the recording rate is decreased to decrease the amount of data per unit of time if it is easy to make the encoding rate higher because of such a reason as a small degree of picture movement. By varying the recording rate finely according to picture conditions as mentioned above, video data can be recorded without degrading the quality of image.

In an application where video data of a TV broadcast program is recorded at a variable rate, however, an allowable recording time period cannot be calculated accurately even if the amount of data recordable on the disc is known since the amount of data per unit of time varies depending on picture conditions.

In the user interface of the present preferred embodiment, an allowable recording time period is indicated even in case of variable-rate data recording and alternatives in recording condition setting are indicated according to the indicated allowable recording time period.

As an example, the manner of operation in which an allowable recording time period on a disc is indicated using the remote controller 204 in the usage form shown in FIG. 2 is explained below.

Figure 3:
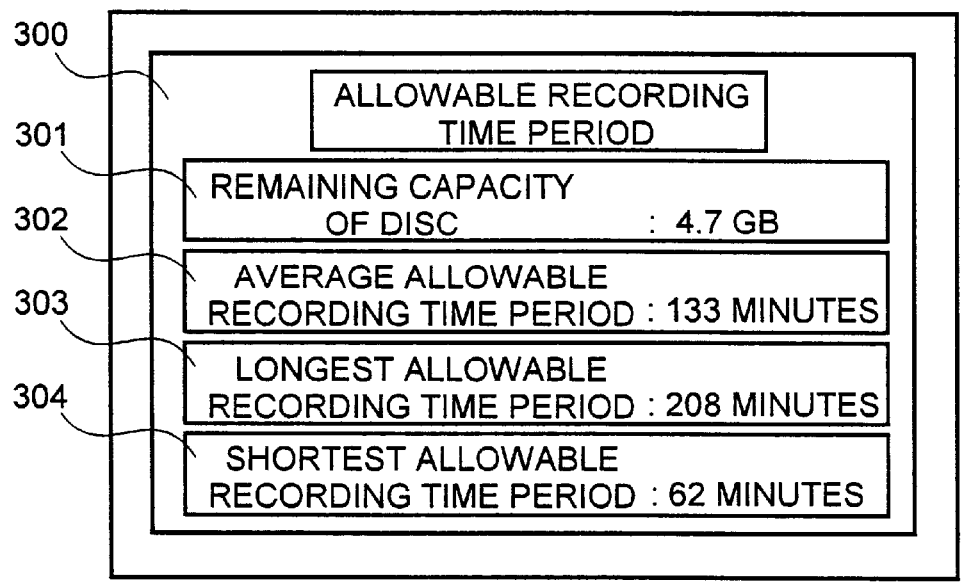
FIG. 3 is a diagram showing an example of a screen displaying allowable recording time periods in the preferred embodiment of the present invention.

Referring to FIG. 3, there is shown an example of a screen indicating allowable recording time periods in the preferred embodiment of the present invention. Screen 300 displayed on the TV monitor 200 provides indication items 301, 302, 303 and 304. In this example, the indication item 301 indicates the remaining capacity of a disc, the indication item 302 indicates an average allowable recording time period, the indication item 303 indicates an allowable recording time period for continuous recording operation at a minimum recording rate (longest allowable recording time period), and the indication item 304 indicates an allowable recording time period for continuous recording operation at a maximum recording rate (shortest allowable recording time period).

The amount of data recordable on a disc, i.e., the remaining capacity of a disc can be known easily by reading out relevant information recorded on the disc through the use of the disc device 108. Values of the average allowable recording time period, longest allowable recording time period, and shortest allowable recording time period are calculated by the CPU 106. For example, it is herein assumed that the indication item 301 indicates 4.7 GB (gigabytes) as the remaining capacity of a disc and the video processing IC 103 is capable of encoding video data at a variable rate in a range of 3 to 10 Mbps (megabits per second) (the amount of data per unit of time). In case that video data is to be recorded continuously at a maximum level of 10 Mbps in the variable-rate range, a period of approx. 62 minutes is determined as the shortest allowable recording time period. In case that video data is to be recorded continuously at a minimum level of 3 Mbps in the variable-rate range, a period of 208 minutes is determined as the longest allowable recording time period. In case that an average value of the amount of data per unit of time at a variable rate defined in terms of system performance is 4.7 Mbps, an average allowable recording time period of approx. 133 minutes is determined. This average allowable recording time period is calculated on the basis of an average value in variable-rate encoding of commercially available movies at present, which is pre-stored in the disc recorder 202. Thus, the disc recorder 202 can carry out calculation of an average allowable recording time period. It will be obvious to those skilled in the art that the average value is not limited to 4.7 Mbps in practicing the present invention. As described later, a different average value may be provided by changing a maximum or minimum level in a variable-rate range.

Since these indications are given, the user can know the remaining capacity of a disc together with an average allowable time period and a range of allowable recording time for variable-rate recording operation. In the example mentioned above, the user can know that it is possible to record video data on the disc in the disc recorder 202 for a period of 133 minutes in most cases, for a period of at least 62 minutes, or for a period of 208 minutes at maximum.

The indication items 301, 302, 303 and 304 may be displayed at the same time, selectively as specified by the user, or in succession.

Then, the following describes an example of a user interface for indicating alternatives in recording condition setting (record programming setup) according to the remaining capacity of a disc.

In preselection of a TV broadcast program in a conventional VTR, most users determine a kind of cassette tape in consideration of a time length of the TV program to be recorded. For example, to record a one-hour TV program, a 60-minute cassette tape or 120-minute cassette tape is employed. When recording a three-hour TV program, some users may employ a 60-minute cassette tape under a triple-extended long-time recording condition with sacrifice in image quality, and other users may employ a combination of a 120-minute cassette tape and a 60-minute cassette tape to avoid sacrifice in image quality. In another situation, some users may want to record four 30-minute stories of a TV drama series on a 120-minute cassette tape.

Further, it may be desired to record a particular part of a TV program in an instant, or it may be desired to record a TV program until any cassette tape being used becomes full.

As in the case of the conventional VTR, where an allowable recording time period is predefined, the user can easily check a relationship between the remaining time available on a recording medium and a time period to be taken for recording. In such a situation, there is no problem in particular. In use of the disc recorder capable of recording video data at a variable rate, there occur variations in terms of the amount of video data due to variable picture conditions even in video data recording for the same period. Therefore, if recording conditions are determined just by judgment of the user, a TV program may not be recorded fully or the quality of image may be degraded unnecessarily in recording.

Degradation of image quality herein signifies that an average value or a maximum value in a variable-rate range is decreased in order to record video data for a necessary period of time. That is, video data is recorded at a rate lower than a standard level required for attaining normal image quality (adjusted variable-rate recording operation).

The above disadvantage incurred by recording data at a variable rate, i.e., degradation of image quality may be controlled by the disc recorder. However, if a recording level in a variable-rate range is decreased forcedly by the disc recorder, it gives rise to a problem to some users who do not like recording conditions that will result in degradation of image quality. Therefore, in the present preferred embodiment, there is provided such an arrangement that the user can select recording conditions indicated in setup operation instead of leaving the entire control to the disc recorder.

Denoting a recording time to be taken as "T" and a disc capacity to be reserved at the end of recording as "K", a disc capacity usable for the recording time "T" can be attained by subtracting the disc capacity to be reserved at the end of recording "K" from a free disc space "S", i.e., "S−K".

The amount of disc space to be used actually is determined through multiplication of an average variable-rate value by the recording time "T", i.e., "average variable-rate value×T". However, as mentioned above, a recording rate is varied depending on picture conditions in variable-rate video data recording. Therefore, an average variable-rate value cannot be known until completion of actual recording. Provided that a variable-rate range is known, it is possible to calculate a maximum allowable disc capacity and a minimum allowable disc capacity.

Using a maximum variable-rate value "M" and the recording time "T", a maximum allowable disc capacity can be expressed as "M×T". Using a minimum variable-rate value "N" and the recording time "T", a minimum allowable disc capacity can be expressed as "N×T". As to "M×T", "N×T", and "S−K" (disc capacity usable for the recording time "T"), any one of the following three relational expressions is applicable:

Case 1: $M \times T \leq S-K$

Case 2: $N \times T \leq S-K < M \times T$

Case 3: $S-K < N \times T$ where,

T: Recording time period to be taken

M: Maximum variable-rate value

N: Minimum variable-rate value

S: Free disc space (remaining disc capacity) at the point in time of programming setup K: Disc capacity to be reserved at the end of recording An example of a user interface in each of the above cases is explained below. In the present preferred embodiment, it is assumed that a maximum variable-rate value (level) is 10.0 Mbps and a minimum variable-rate value (level) is 3.0 Mbps.

First, the following describes case 1:

In case 1, a disc capacity calculated by subtracting a disc capacity to be reserved at the end of recording from the remaining capacity of a disc is larger than or equal to a disc capacity to be used for recording at the maximum variable-rate level for a specified recording time period. In this case, any video data can be recorded fully for the specified time period in normal variable-rate recording operation.

Figure 4:
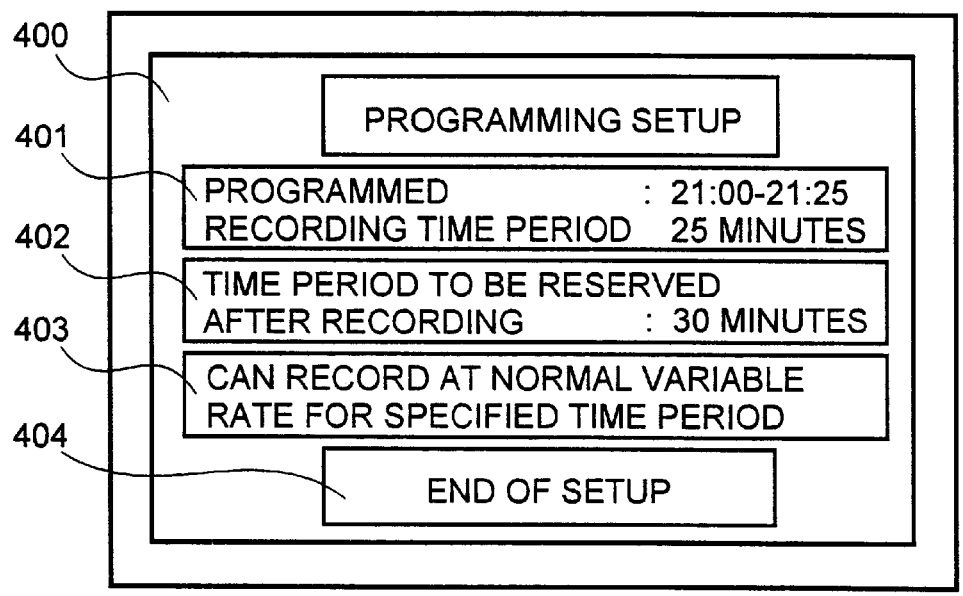
FIG. 4 is a diagram showing an example of a programming setup screen in case 1 in the preferred embodiment of the present invention.

As shown in FIG. 4, screen 400 for programming setup is displayed on the TV monitor 200. For example, through the use of the remote controller 204 or the like, the user specifies a period of 25 minutes from 21:00 to 21:25 at an item 401 indicating a programmed recording time period and a period of 30 minutes at an item 402 indicating a time period to be reserved after recording, which represents a disc capacity to be reserved at the end of recording. It is herein assumed that the remaining capacity of the disc is 4.7 GB at the point in time of this programming setup.

In the disc recorder 202, it is necessary to reserve a disc space of approx. 2.2 GB for recording data at the maximum variable-rate level of 10.0 Mbps for a period of 30 minutes. Through calculation by the CPU 105, it is determined that a disc capacity usable for a 25-minute TV program is 2.5 GB (=4.7 GB−2.2 GB). Further, it is determined that a disc capacity to be used for continuous recording of the 25-minute TV program at the maximum variable-rate level of 10.0 Mbps is approx. 1.8 GB. Thus, the CPU 105 judges that data can be recorded properly for a period of 25 minutes from 21:00 to 21:25 as specified by the user. In this case, a period of 30 minutes is assigned to represent a disc capacity to be reserved at the end of recording (a time period to be reserved after recording). In calculation, the maximum variable-rate level is used in order to reserve a space sufficient for recording any video data for 30 minutes and to form a judgment whether video data recording can be made as specified by the user. Therefore, it is not necessarily required to use the maximum variable-rate level in calculation. Based on an average variable-rate value, a disc capacity to be reserved at the end of recording may be calculated to allow further video data recording for 30 minutes in most cases. In another modification, there may be provided such an arrangement that the user can select any one of alternatives for calculating a disc capacity to be reserved at the end of recording.

In the present preferred embodiment, the disc recorder 202 provides an indication item 403 indicating that the 25-minute TV program can be recorded at a normal variable rate (not at an adjusted variable rate) for the specified period of time. Then, to terminate this programming setup, the user has only to select a button 404 indicating the end of setup through the use of the remote controller 204 or the like.

Even in case of a disc recorder arrangement that might not be capable of recording video data for a specified period of time due to picture conditions, these indications mentioned above permit the user to check whether or not video data is to be recorded as specified. Thus, the ease-of-use of the disc recorder can be improved.

Then, the following describes case 2:

In case 2, a disc capacity calculated by subtracting a disc capacity to be reserved at the end of recording from the remaining capacity of a disc is smaller than a disc capacity to be used for recording at the maximum variable-rate level for a specified recording time period and it is larger than or equal to a disc capacity to be used at the minimum variable-rate level for a specified recording time period. In this case, if the amount of video data to be recorded per unit of time is rather large due to such a reason as a large degree of picture movement, a recording rate tends to increase and there is a possibility that video data may not be recorded fully for the specified recording time period under normal variable-rate recording condition. However, by regulating an average rate in adjusted variable-rate recording operation, video data can be recorded fully for the specified recording time period.

The manner of adjusted variable-rate recording operation is explained below: In the CPU 105, an average value of variable rates for video data recording is calculated in a predetermined cycle. For instance, if it is found that video data cannot be recorded fully at the calculated average rate for a specified recording time period, the CPU 105 controls the video processing IC 103 to decrease the maximum variable-rate level. Thus, variable-rate adjustment is carried out (to increase a encoding rate of video data). Adjustment of the maximum variable-rate level results in the average variable-rate level being adjusted. By means of adjusted variable-rate recording operation in which the average variable-rate level is adjusted as mentioned above, it is possible to record video data fully for a specified recording time period without fail. Further, instead of decreasing the maximum variable-rate level, there may be provided such a method that recording levels in the entire variable-rate range applicable to recording are made uniformly lower than a standard rate required for attaining normal image quality. Still further, for making degradation of image quality inconspicuous, there may be provided such an arrangement that a particular range of variable rates only is narrowed for limitation, e.g., a variable-rate range of 5 to 6 Mbps is narrowed to a range of 3 to 4 Mbps.

The undermentioned description concerning case 2 is based on the following assumption: Through the use of the remote controller 204 or the like, the user specifies a period of 45 minutes from 21:00 to 21:45 as a programmed recording time period and a period of 30 minutes as a time period to be reserved after recording, which represents a disc capacity to be reserved at the end of recording. The remaining capacity of the disc is 4.7 GB at the point in time of programming setup.

Figure 5:
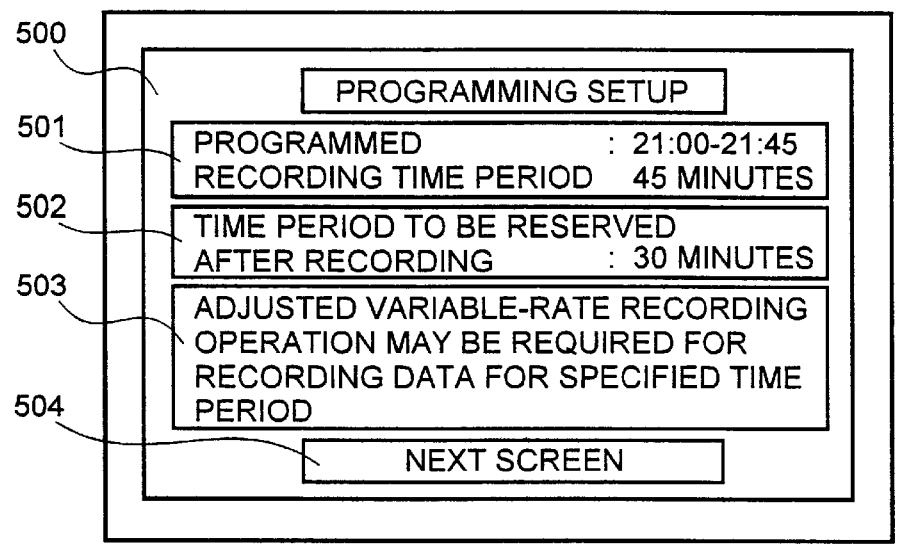
FIG. 5 is a diagram showing an example of a programming setup screen in case 2 in the preferred embodiment of the present invention.

As shown in FIG. 5, the disc recorder 202 presents indication items 501, 502 and 503 on screen 500 displayed on the TV monitor 200. In the present preferred embodiment, the indication item 501 indicates a programmed recording time period specified by the user, the indication item 502 indicates a time period to be reserved after recording, and the indication item 503 indicates a message concerning a possible problem in execution of programming setup specified by the user.

In the disc recorder 202, it is necessary to reserve a disc space of approx. 2.2 GB for recording data at the maximum variable-rate level of 10.0 Mbps for a period of 30 minutes. Through calculation by the CPU 105, it is determined that a disc capacity usable for a 45-minute TV program is 2.5 GB (=4.7 GB−2.2 GB). A disc capacity to be reserved at the end of recording is determined on the same principle as that in the foregoing case 1. Further, since the disc capacity of 2.5 GB is smaller than a disc capacity of approx. 3.3 GB to be used for continuous recording of the 45-minute TV program at the maximum variable-rate level of 10.0 Mbps, the CPU 105 judges that the usable disc capacity may be exceeded in normal variable-rate recording of the 45-minute TV program. Still further, since the disc capacity of 2.5 GB is larger than a disc capacity of approx. 1 GB to be used for continuous recording at the minimum variable-rate level of 3.0 Mbps, the CPU 105 judges that the 45-minute TV program can be recorded if a product value attained in multiplication of an actual average variable-rate value by a recording time period of 45 minutes is less than 2.5 GB.

Therefore, at the indication item 503, the disc recorder 202 presents a message saying that there is a possibility that adjusted variable-rate recording operation may be required for recording video data for the recording time period specified by the user. At an indication item 504, the disc recorder 202 presents a button indicating a path to the next screen so that the user can set up optimum recording conditions as desired. Through the use of the remote controller 204 or the like, the user selects the indication item 504 to go to the next screen.

Figure 6:
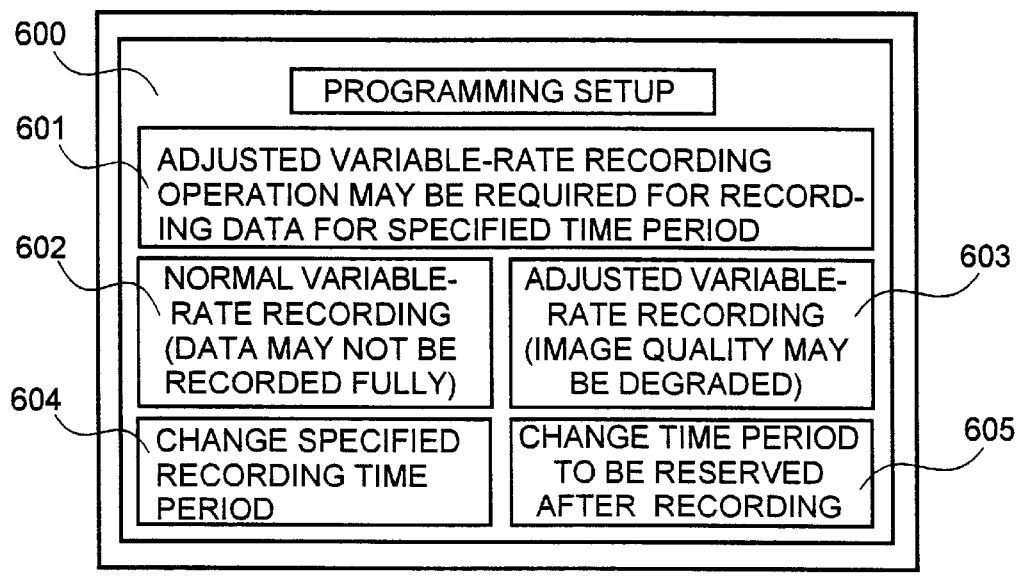
FIG. 6 is a diagram showing an example of a programming setup screen in case 2 in the preferred embodiment of the present invention.

Referring to FIG. 6, there is shown a diagram of screen 600 which is the next screen to be displayed when the indication item 504 is selected. On screen 600, the disc recorder 202 presents an item 601 indicating that there is a possibility that adjusted variable-rate recording operation may be required for recording video data fully for the recording time period specified by the user. As solutions to the problem indicated at the item 601, option items 602 and 603 are presented. Each of the option items 602 and 603 indicates a solution and a possible resultant condition to be incurred when the solution is selected. Since possible resultant conditions are indicated, the user can check in advance each possible result to be incurred by his or her own selection of a solution. Thus, the ease-of-use of the disc recorder can be improved. In the present preferred embodiment, the option item 602 indicates a selection of normal variable-rate recording operation, and the option item 603 indicates a selection of adjusted variable-rate recording operation. To specify normal variable-rate recording, the user selects the option item 602. To specify adjusted variable-rate recording, the user selects the option item 603.

Further, neither the option item 602 nor 603 may be acceptable by some users. Therefore, on screen 600, the disc recorder 202 presents option items 604 and 605 so that the user can change the specified recording time period or the specified time period to be reserved after recording in the session of programming setup. Selection of the option item 604 permits the user to change the specified recording time period, and selection of the option item 605 permits the user to change the specified time period to be reserved after recording.

It is to be understood by those skilled in the art that the disposition of the items 601 to 605 is not limited to the layout shown in FIG. 6. However, these items are preferably disposed as exemplified in FIG. 6. In the layout shown in FIG. 6, the item indicating the problem to be noted in execution of programming setup specified by the user, the items indicating solutions, and the items indicating steps for changing the specified conditions in programming setup are arranged in the order from top to bottom according to the problem-solving procedural flow to be taken by the user. The user can therefore check each item easily just by browsing from top to bottom on the screen. Having no feeling of troublesomeness, the user can locate each item promptly. The ease of use can be ensured by arranging the items on the screen as mentioned above, Then, the following describes case 3:

In case 3, a disc capacity calculated by subtracting a disc capacity to be reserved at the end of recording from the remaining capacity of a disc is smaller than a disc capacity to be used for recording at the minimum variable-rate level for a specified recording time period. In this case, video data cannot be recorded fully for the specified recording time period in continuous recording even at the minimum variable-rate level under adjusted variable-rate recording condition.

In the description concerning case 3, the following assumption is taken as an example: Through the use of the remote controller 204 or the like, the user specifies a period of 200 minutes from 21:00 to 24:20 as a programmed recording time period and a period of 30 minutes as a time period to be reserved after recording, which represents a disc capacity to be reserved at the end of recording. The remaining capacity, of the disc is 4.7 GB at the point in time of programming setup.

Figure 7:
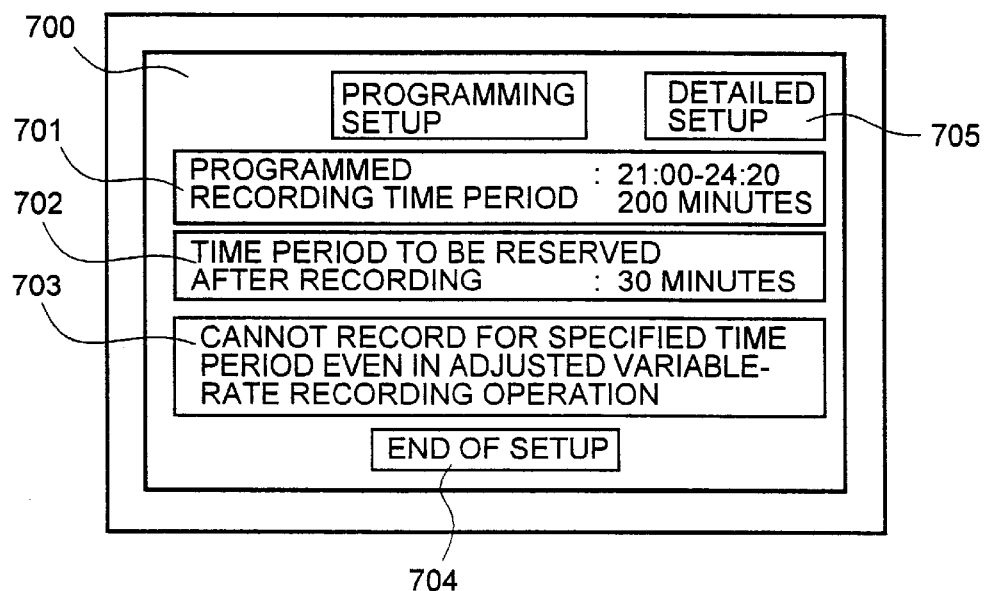
FIG. 7 is a diagram showing an example of a programming setup screen in case 3 in the preferred embodiment of the present invention.

As shown in FIG. 7, the disc recorder 202 presents indication items 701, 702 and 703 on screen 700 displayed on the TV monitor 200. In the present preferred embodiment, the indication item 701 indicates a programmed recording time period specified by the user, the indication item 702 indicates a time period to be reserved after recording, and the indication item 703 indicates a message concerning a possible problem in execution of programming setup specified by the user.

In the disc recorder 202, it is necessary to reserve a disc space of approx. 2.2 GB for recording data at the maximum variable-rate level of 10.0 Mbps for a period of 30 minutes. Through calculation by the CPU 105, it is determined that a disc capacity usable for a 200-minute TV program is 2.5 GB (=4.7 GB−2.2 GB). Since the disc capacity of 2.5 GB is smaller than a disc capacity of approx. 3.3 GB to be used for continuous recording at the minimum variable-rate level of 3.0 Mbps for a period of 180 minutes, the CPU 105 judges that the usable disc capacity will be exceeded in normal variable-rate recording of the 200-minute TV program even if image quality is degraded to any extent. Even in a situation where it is required to reserve just a small disc capacity of approx. 0.7 GB for 30-minute recording at the minimum variable-rate level of 3.0 Mbps (a time period of at least 30 minutes to be reserved after recording), the disc capacity usable for the 200-minute TV program is 4.0 GB (=4.7 GB−0.7 GB). Since this usable disc capacity is less than 4.4 GB, the CPU 105 judges that video data recording for the specified recording time period is impossible. Unlike cases 1 and 2, calculation of the disc capacity to be reserved at the end of recording is herein based on the minimum variable-rate level instead of the maximum variable-rate level for the purpose of checking that video data cannot be recorded as specified by the user even in a condition where the disc capacity to be reserved at the end of recording is estimated to be a minimum value. Therefore, it is not necessarily required to use the minimum variable-rate level in calculation. Based on an average variable-rate value, a disc capacity to be reserved at the end of recording may be calculated to allow further video data recording for 30 minutes in most cases. In another modification, there may be provided such an arrangement that the user can select any one of alternatives for calculating a disc capacity to be reserved at the end of recording.

Since the usable disc capacity is exceeded even if image quality is degraded to any extent, the disc recorder 202 presents the indication item 703 indicating a message concerning a possible problem in execution of programming setup specified by the user. More specifically, the indication item 703 indicates that video data cannot be recorded fully for the specified recording time period even in adjusted variable-rate recording operation. Then, to terminate this programming setup, the user selects an item 704 indicating the end of setup. Thus, the user can quit the programming setup. To set up optimum recording conditions as desired, the user selects an item 705 indicating a path to the succeeding screen for detailed setup through the use of the remote controller 204 or the like.

Figure 8:
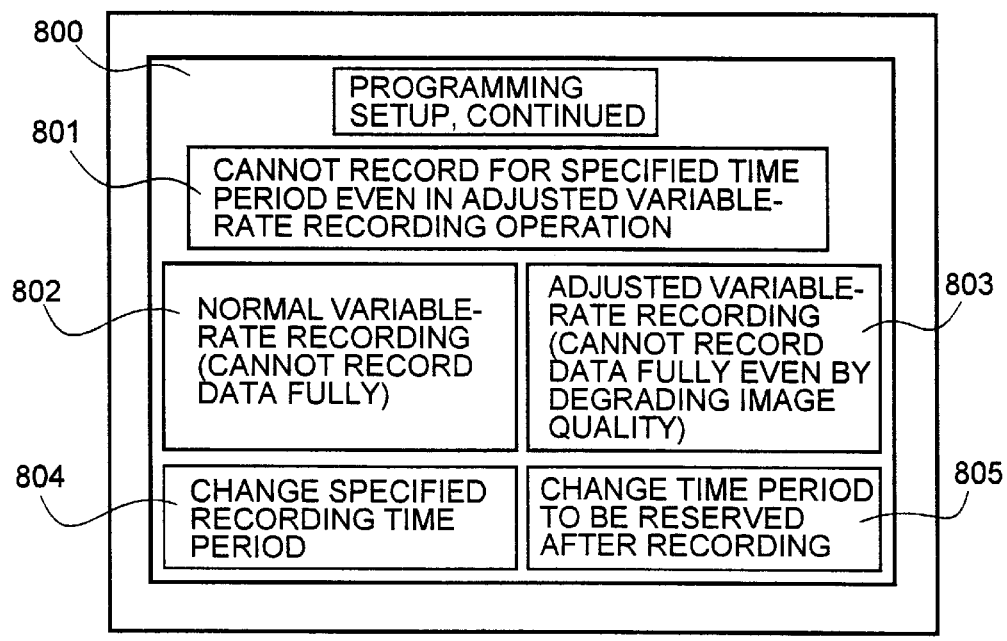
FIG. 8 is a diagram showing an example of a programming setup screen in case 3 in the preferred embodiment of the present invention.

Referring to FIG. 8, there is shown a diagram of screen 800 which is the succeeding screen to be displayed for detailed setup when the use selects the item 705. On screen 800, the disc recorder 202 presents an item 801 indicating a message concerning a possible problem in execution of programming setup specified by the user, i.e., the item 801 indicates that video data cannot be recorded fully for the specified recording time period even in adjusted variable-rate recording operation. In the present preferred embodiment, an option item 802 is provided for selection of normal variable-rate recording, and an option item 803 is provided for selection of adjusted variable-rate recording. Even if either the option item 802 or 803 is selected, video data cannot be recorded as specified by the user. Therefore, in a modified arrangement, these option items 802 and 803 may be omitted. In the present preferred embodiment where the option items 802 and 803 are indicated in case 3, the user can specify normal variable-rate recording by selecting the option item 802 or adjusted variable-rate recording by selecting the option item 803.

Further, in case 3, since the user would rarely select the option item 802 or 803, the disc recorder 202 presents option items 804 and 805 on screen 800 so that the user can change the specified recording time period or the specified time period to be reserved after recording in the session of programming setup. Selection of the option item 804 permits the user to change the specified recording time period, and selection of the option item 805 permits the user to change the specified time period to be reserved after recording.

In the three cases exemplified above, a disc capacity to be used for recording video data for a specified recording time period and a time period to be reserved after recording are calculated using the maximum variable-rate level for the purpose of ensuring 100% reliability of recording operation. However, in most cases, video data can be recorded satisfactorily at an average level of variable rates. Therefore, the average variable-rate level may be used as a judgment criterion in calculation of the disc capacity to be used for recording data for the specified recording time period and the time period to be reserved after recording, or the results of judgment based on the average and maximum variable-rate levels may be indicated to the user.

Figure 9:
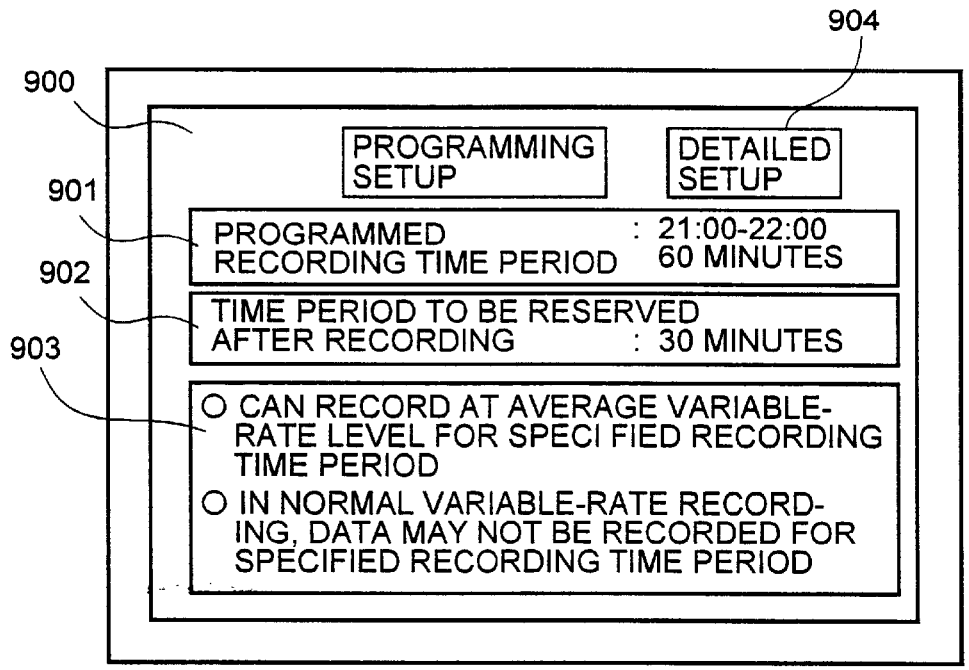
FIG. 9 is a diagram showing a modified example of a programming setup screen in the preferred embodiment of the present invention.

Referring to FIG. 9, there is shown a diagram of screen 900 for programming setup. For example, it is assumed that the user specifies a period of 60 minutes from 21:00 to 22:00 as a programmed recording time period and a period of 30 minutes as a time period to be reserved after recording, which represents a disc capacity to be reserved at the end of recording. The remaining capacity of a disc is assumed to be 4.7 GB at the point in time of programming setup.

As shown in FIG. 9, the disc recorder 202 presents indication items 901, 902 and 903 on screen 900 displayed on the TV monitor 200. In the present preferred embodiment, the indication item 901 indicates a programmed recording time period specified by the user, the indication item 902 indicates a time period to be reserved after recording, and the indication item 903 indicates a message concerning effects that will be given in execution of programming setup specified by the user.

In the disc recorder 202, it is necessary to reserve a disc space of approx. 2.2 GB for recording data at the maximum variable-rate level of 10.0 Mbps for a period of 30 minutes. Through calculation by the CPU 105, it is determined that a disc capacity usable for a 60-minute TV program is 2.5 GB (=4.7 GB−2.2 GB) . Since the disc capacity of 2.5 GB is smaller than a disc capacity of approx. 4.4 GB to be used for continuous recording at the maximum variable-rate level of 10.0 Mbps for a period of 60 minutes, the CPU 105 judges that the usable capacity may be exceeded in normal variable-rate recording of the 60-minute TV program. On the other hand, the CPU 105 judges that it is required to reserve just a small disc capacity of approx. 1 GB for recording video data at an average variable-rate level of 4.7 Mbps for a period of 30 minutes. It is then judged that the disc capacity usable for the 60-minute TV program is 3.7 GB (=4.7 GB−1 G).

The usable disc capacity of 3.7 GB is smaller than the disc capacity of approx. 4.4 GB to be used for continuous recording at the maximum variable-rate level of 10.0 Mbps for a period of 60 minutes. However, if it is satisfactory to record the 60-minute TV program at the average variable-rate level of 4.7 Mbps, a disc capacity as small as approx. 2.1 GB is required. The CPU 105 therefore judges that the 60-minute TV program can be recorded at the average variable-rate level for the specified recording time period.

At the indication item 903, the disc recorder 202 presents the result of this judgment. In consideration of a situation where normal variable-rate recording is absolutely necessary, there may be provided an item 904 for detailed setup so that the user can select recording conditions.

Figure 10:
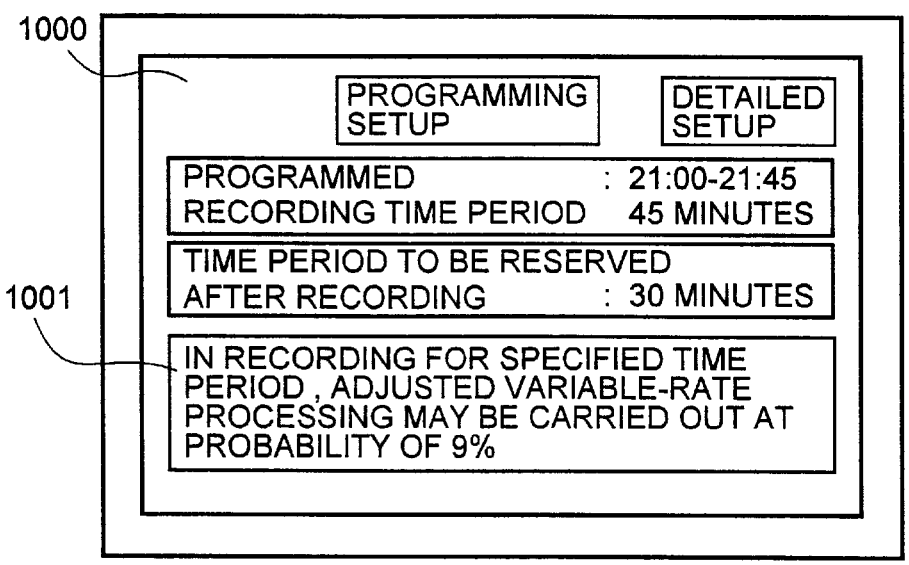
FIG. 10 is a diagram showing another modified example of a programming setup screen in the preferred embodiment of the present invention.

Besides, as exemplified on screen 1000 for programming setup in FIG. 10, in a situation where the user specifies a programmed recording time period and an operation of adjusted variable-rate recording is to be performed according to such reference data stored in the disc recorder as a free disc space (remaining disc capacity) and an average variable-rate level, a probability of actual operation of adjusted variable-rate recording may be indicated in terms of percentage (%) at an indication item 1001.

It will be obvious to those skilled in the art that these indication items may be so arranged that any items desired by the user can be displayed at all times or any item can be displayed selectively as desired by the user.

Further, in another modified technique, there may be provided such an arrangement that, during normal variable-rate recording operation, an average variable-rate value actually used in recording is calculated from already recorded data and the amount of remaining allowable recording time based on the calculated average variable-rate value is indicated for video source data being recorded. This modified technique is also applicable to a video camcorder using a disc as a recording medium (disc camcorder) as well as a disc recorder.

Figure 11:
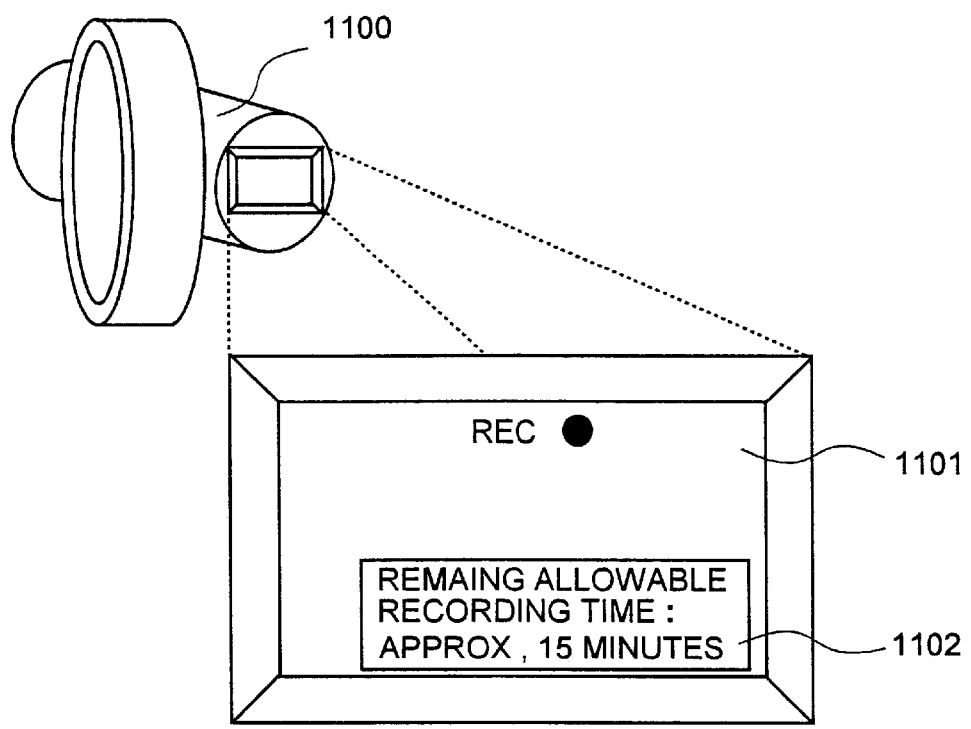
FIG. 11 is a diagram showing an example in which the present invention is applied to a disc camcorder.

Referring to FIG. 11, there is shown a diagrammatic illustration of a disc camcorder 1100 designed as a commercial product. As in the case of the disc recorder 202, the disc camcorder 1100 can be so arranged as to calculate the amount of remaining allowable recording time using a CPU incorporated therein and indicate such information as remaining allowable recording time at an item 1102 on a liquid crystal display 1101 equipped thereon or the like. Thus, as is the case with the disc recorder of a stationary type, an approximate period of remaining allowable recording time can be checked easily on the disc camcorder capable of recording video data at a variable rate.

Figure 12:
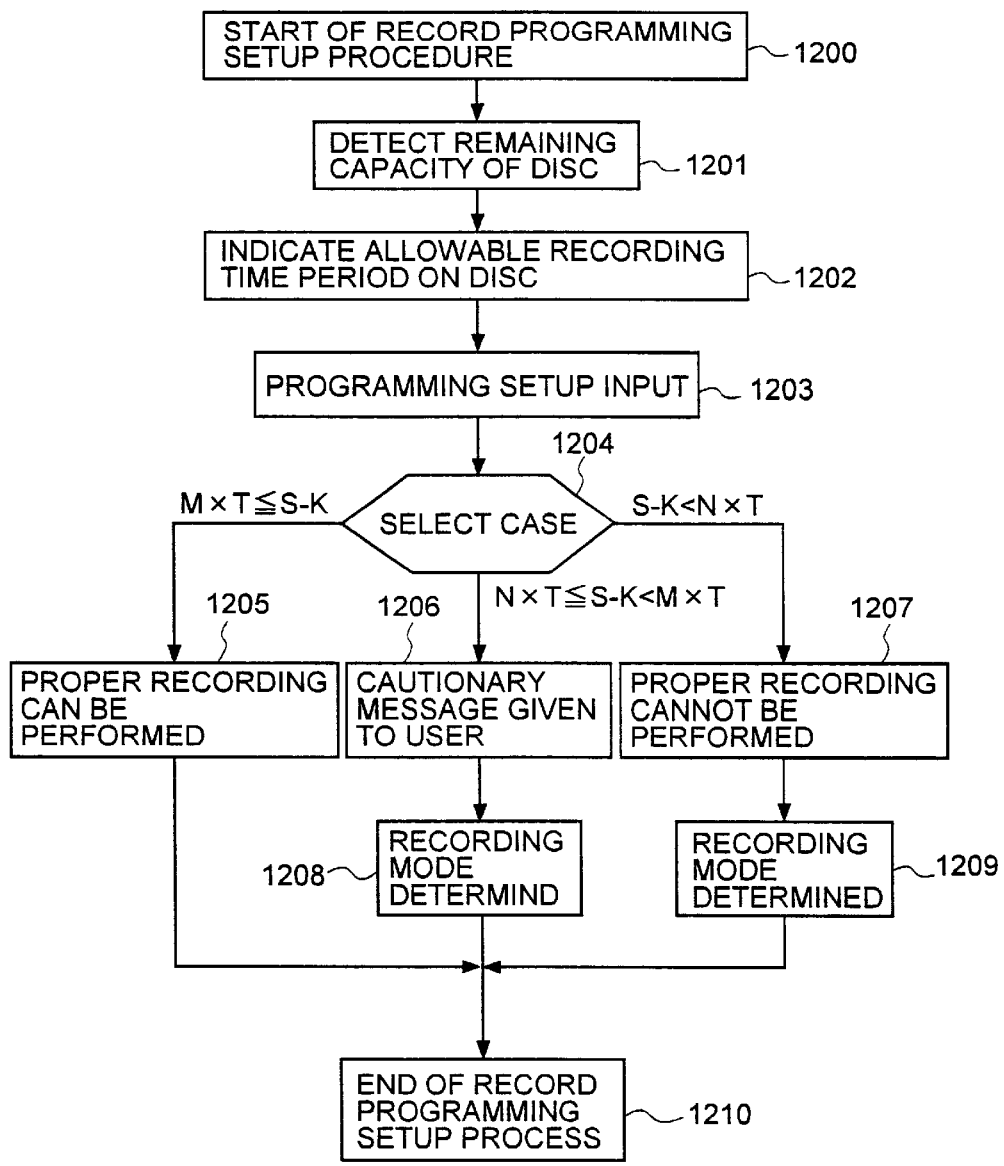
FIG. 12 is a diagram showing an example of a record programming setup process flow in the preferred embodiment of the present invention.

Finally, the following describes an example of a record programming setup process as related to the aforementioned cases 1 and 3 with particular reference to a flowchart shown in FIG. 12.

In the record programming setup process, when a button or the like for starting the record programming setup process (not shown) is pressed on the remote controller 204 or the disc recorder 202, the operation control IC 106 in the disc recorder 202 detects it to start the record programming setup process (step 1200).

Then, the remaining capacity of a disc is calculated (step 1201). At this step, the disc device 108 in the disc recorder 202 reads out data from the disc, and the CPU 105 carries out calculation. In this example, calculation is performed to determine the remaining capacity of the disc. In case that the disc contains information concerning its free space, the remaining capacity of the disc can be known easily.

Then, an allowable recording time period on the disc is indicated (step 1202). At this step, the CPU 105 in the disc recorder 202 calculates the allowable recording time period on the disc according to the remaining capacity of the disc and the maximum, average or minimum variable-rate value, and the display control IC 107 outputs the result of calculation to the TV monitor 200 or the like. A screen such as that illustrated in FIG. 3 is displayed at this step.

Then, the user performs programming setup input (step 1203). When an input button or the like (not shown) equipped on the remote controller 204 or the disc recorder 202 is pressed, the operation control IC 106 in the disc recorder 202 detects it. Thus, an input for programming setup can be recognized.

Then, according to the remaining capacity of the disc calculated at step 1201 and the programming setup input specified at step 1203, one of the aforementioned three cases 1 to 3 is selected (step 1204). This selection is carried out by the CPU 105 in the disc recorder 202 as explained in the foregoing description.

If it is judged at step 1204 that proper recording will be performed, step 1205 is selected. Then, step 1210 is taken to terminate the record programming setup process. This procedural flow path corresponds to case 1. In this case, a screen such as shown in FIG. 4 is displayed on the TV monitor 200 or the like.

Alternatively, if it is judged at step 1204 that a cautionary message is to be given to the user, step 1206 is selected to display a screen such as shown in FIG. 5 for indicating a cautionary message to the user. Then, step 1208 is taken to determine recording conditions in detailed setup on a screen such as shown in FIG. 6. Thereafter, upon completion of establishing the recording conditions in detailed setup, step 1201 is taken to terminate the record programming setup process.

Further alternatively, if it is judged at step 1204 that video data recording for a programmed recording time period specified by the user is impossible, step 1207 is selected to display a screen such as shown in FIG. 7 for indicating a cautionary message to the user. Then, step 1209 is taken to determine recording conditions in detailed setup on a screen such as shown in FIG. 8. Thereafter, upon completion of establishing the recording conditions in detailed setup, step 1201 is taken to terminate the record programming setup process.

While the present invention has been described in detail with respect to the record programming setup process, there may also be provided such a modified arrangement that either the normal variable-rate recording operation or the adjusted variable-rate recording operation is selectable by the user just when starting video data recording without making the record programming setup. In this modified arrangement, when the adjusted variable-rate recording operation is selected, a variable rate may be adjusted on the basis of an average variable-rate value since no parameters regarding record programming setup are available. Further, it is possible to provide such an arrangement that the user can change recording conditions during recording operation.

Although the preferred embodiments in application to the disc recorder have been described, it is to be understood by those skilled in the art that the present invention is applicable to a memory recorder apparatus which is capable of performing variable-rate recording operation using a memory circuit.

As set forth hereinabove and according to the present invention, in a data recording apparatus in which a recording method of varying the amount of data to be recorded per unit of time according to picture conditions is used and therefore the amount of storage space necessary for recording data cannot be known, there is provided an arrangement for calculating an approximate period of remaining allowable recording time, forming a judgment whether or not data can be recorded fully for a time period specified by the user, and indicating the result of judgment to the user. Further, in a situation where there is a possibility that data may not be recorded fully for the time period specified by the user, a cautionary message concerning a possible problem is indicated together with any proposed solutions to be selected by the user, and according to the result of selection, the amount of data to be recorded per unit of time is adjusted properly.

As mentioned above, in a disc recorder apparatus capable of performing variable-rate recording, the present invention makes it possible to indicate a proper period of remaining allowable recording time according to the remaining capacity of a disc.

Further, in a modified arrangement of a user interface for selecting a normal variable-rate recording operation or an adjusted variable-rate recording operation, the user can specify more suitable recording conditions for proper recording according to information on record programming setup and a period of remaining allowable recording time on a disc.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A data recording apparatus comprising:

recording-reading means for recording data on a recording medium while varying the amount of data per unit of time according to picture conditions and for reading out data thus recorded on said recording medium;

calculating means for determining an allowable recording capacity of said recording medium and calculating an allowable recording time period thereon according to the determined recording capacity and the amount of data per unit of time;

decision means for determining recording conditions according to the calculated allowable recording time period and setup conditions specified through input means; and indicating means for indicating the calculated allowable recording time period and the determined recording conditions;

wherein there is provided a recording condition mode of operation in which variable-rate recording is performed by varying the amount of data per unit of time according to picture conditions.

2. A data recording apparatus as claimed in claim 1, wherein there is provided a recording condition mode of operation in which adjusted variable-rate recording is performed by regulating such a parameter as a maximum variable-rate level taken when varying the amount of data per unit of time according to picture conditions in order to adjust an average variable-rate level properly.

3. A data recording apparatus as claimed in claim 1, wherein a user can specify at least one of recording condition parameters including a recording time period to be taken, a time period to be reserved after recording, and a recording condition mode of operation.

4. A data recording apparatus as claimed in claim 1, further comprising:

judging means for forming a judgment whether a recording operation specified by the user can be carried out or not, said judging means being so arranged as that said judgment is made according to the calculated allowable recording time period at a step of determining recording conditions for a recording medium, wherein the result of said judgment is indicated to the user.

5. A data recording apparatus as claimed in claim 1, wherein, at a step of determining recording conditions for a recording medium, an allowable recording capacity thereof which is attained by subtracting a recording capacity thereof to be reserved at the end of recording from the remaining capacity thereof at the point in time of programming setup is checked to identify any one of the following three cases, case 1: $M \times T \leq S-K$, case 2: $N \times T \leq S-K < M \times T$, and case 3: $S-K < N \times T$, in which T represents a recording time period to be taken, M represents a maximum variable-rate value, N represents a minimum variable-rate value, S represents a remaining capacity of the recording medium at the point in time of programming setup, and K represents a recording capacity of the recording medium to be reserved at the end of recording; and wherein, according to the result of check, a recording condition selection item is presented by said indicating means.

6. A data recording apparatus as claimed in claim 5, wherein, when said allowable recording capacity is identified as said case 1, said indicating means presents a recording condition selection item indicating that data can be recorded fully for a specified period of time using said variable-rate recording.

7. A data recording apparatus as claimed in claim 5, wherein, when said allowable recording capacity is identified as said case 2, said indicating means presents at least either one of the following recording condition selection items; a recording condition selection item indicating that there is a possibility that data may not be recorded fully for a specified period of time using said variable-rate recording, and a recording condition selection item indicating that data can be recorded fully for a specified period of time using said adjusted variable-rate recording.

8. A data recording apparatus as claimed in claim 5, where, when is aid allowable recording capacity is identified as said case 3, said indicating means presents a recording condition selection item indicating that data cannot be recorded fully for a specified period of time even using said adjusted variable-rate recording.

9. A data recording method, comprising the step of:

recording data on a recording medium while varying the amount of data per unit of time according to picture conditions and for reading out data thus recorded on said recording medium;

determining an allowable recording capacity of said recording medium and calculating an allowable recording time period thereon according to the determined recording capacity and the amount of data per unit of time;

determining recording conditions according to the calculated allowable recording time period and set up conditions specified through input means; and indicating the calculated allowable recording time period and the determined recording conditions.

* * * * *